United States Patent [19]

Klenke

[11] 4,031,834
[45] June 28, 1977

[54] GRAIN DRILL WITH DISK BIASING MEANS

[75] Inventor: Richard J. Klenke, Spearville, Kans.

[73] Assignee: American Products, Inc., Spearville, Kans.

[22] Filed: Sept. 8, 1975

[21] Appl. No.: 611,022

[52] U.S. Cl. .................................. 111/85; 111/87
[51] Int. Cl.² ..................................... F23B 1/00
[58] Field of Search ............... 111/81, 84, 88, 85, 111/86, 87; 172/165, 166, 570, 574; 222/177

[56] References Cited

UNITED STATES PATENTS

| 433,036 | 7/1890 | Rhodes | 111/84 |
|---|---|---|---|
| 677,564 | 7/1901 | Dodson et al. | 111/81 |
| 799,676 | 9/1905 | Roby et al. | 111/87 |
| 830,644 | 9/1906 | Davis | 111/87 |
| 3,175,622 | 3/1965 | Stam | 111/85 |
| 3,611,956 | 10/1971 | Moore et al. | 111/87 X |

*Primary Examiner*—Edgar S. Burr
*Assistant Examiner*—James R. Feyrer
*Attorney, Agent, or Firm*—John H. Widdowson; Edwin H. Crabtree

[57] ABSTRACT

An improved grain drill having individually mounted disks with disk boots. Seed tubes are suspended between each disk and boot. The disks are mounted on disk arms. The disk arms are biased by coil springs which urge the disks into the ground surface. The tension applied by the coil spring on the disk can be increased by adjusting the spring disposed on an adjustable spring tension arm integrally attached to the disk arm.

1 Claim, 5 Drawing Figures

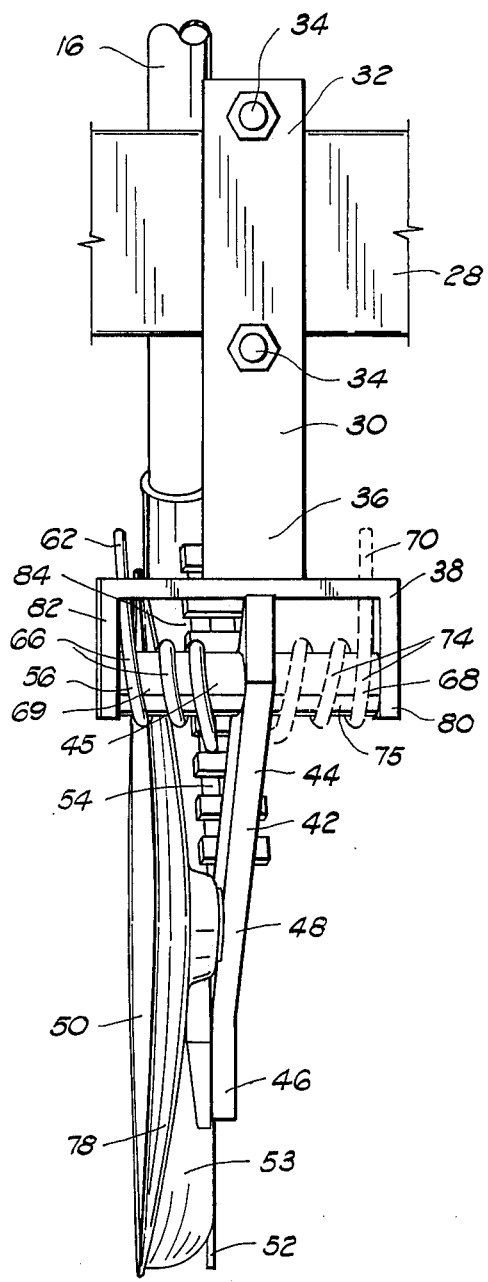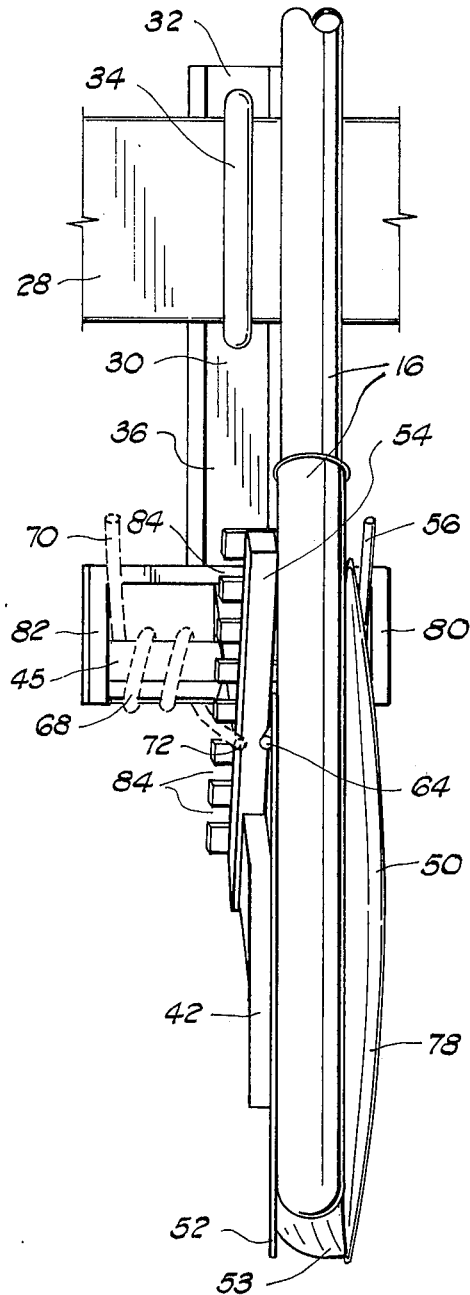

GRAIN DRILL WITH DISK BIASING MEANS

BACKGROUND OF THE INVENTION

This invention relates generally to improvements in the construction of a grain drill, and more particularly, but not by way of limitation, to a biasing means for a grain drill.

There are various types of grain drills with apparatus for biasing the disk into the ground surface. The disk can be biased by hydraulic means, spring means, the use of a torsion bar or the like. None of the prior art devices disclose the novel improved grain drill as described herein.

SUMMARY OF THE INVENTION

The subject invention is easily adaptable to various types of grain drills. Each disk mounted on the grain drill is individually biased into the ground surface by tension placed on the disk arm by a coil spring. The tension applied on the disk is adjustable, thereby allowing each disk to be set with either the same tension or with different tension depending on the soil condition and the depth of furrow to be cut.

The improved grain drill further includes additional coil springs that can be mounted on the drill for applying increased tension on the disk when the drill is in use.

The improved grain drill includes a disk bracket suspended downwardly from the frame of the grain drill. A disk arm is rotatably attached to the disk bracket at one end. A disk boot is attached to the other end of the disk arm. A disk is pivotally attached to a center portion of the disk arm. A coil spring is attached to the disk bracket and disk arm and applies tension force against the disk arm thereby urging the disk into the ground surface.

BRIEF DESCRIPTION OF THE DRAWINGS

FIG. 2 is a front view of the disk, disk boot, and disk biasing means.

FIG. 3 is a rear view of the disk, disk boot, and disk biasing means.

DETAILED DESCRIPTION OF THE DRAWINGS

Figure 1:
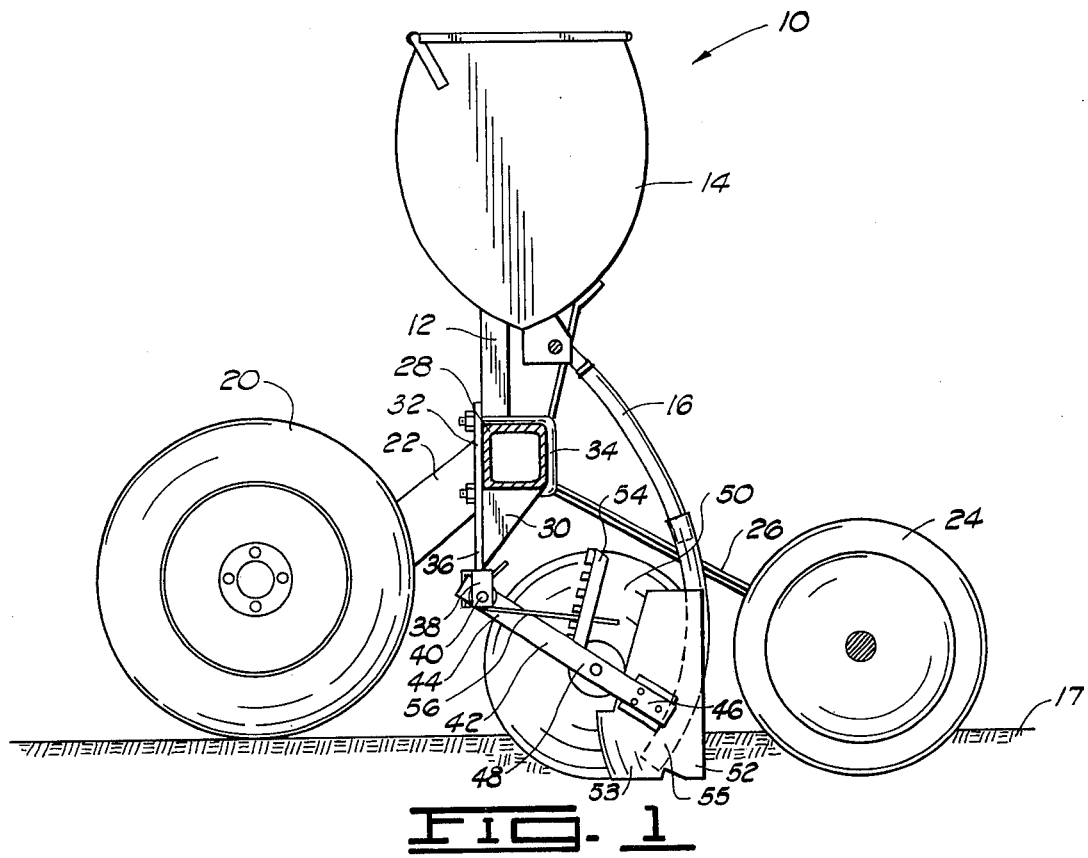
FIG. 1 is a side view of the grain drill.

In FIG. 1 the improved grain drill is designated by general reference number 10. The drill 10 includes a hopper support 12, a seed hopper 14 mounted on top of the hopper support 12, a seed tube 16 suspended from the bottom of the seed hopper 14 for feeding seed into a ground surface 17, a depth gauge and transport wheel 20 rotatably mounted to the front of drill 10 by wheel support 22, and a press wheel 24 mounted to the rear of the grain drill 10 by a press wheel support 26. The hopper support 12 is mounted to an elongated horizontal frame bar 28. The frame bar 28 is positioned transverse to the direction of movement of the drill 10.

Attached to the frame bar 28 is a disk bracket 30. The disk bracket 30 includes a first end portion 32, which is bolted to the frame bar 28 by a U-shaped bolt 34. The disk bracket 30 also includes a second end portion 36 having a U-shaped bracket arm 38 with an arm shaft 40 mounted therebetween.

The grain drill 10 further includes a disk arm 42 having a first end portion 44, a second end portion 46 and a center portion 48. The first end portion 44 includes a bushing 45 pivotly mounted on the arm shaft 40. A disk 50 is rotatably mounted to the center portion 48 of the disk arm 42. A disk boot 52 is attached to the second end portion 46. The boot 52 includes a side portion 53 disposed against the side of the disk 50. The seed tube 16 is shown with an end portion 55 disposed between the disk 50 and the disk boot 52 and in position for dropping seed into the furrow made by the disk 50.

Integrally attached to the top portion of the disk arm 42 is an adjustable spring tension arm 54 for adjusting the tension on the disk arm 42 through the use of a coil spring 56. While FIG. 1 shows only a single gauge wheel 20, press wheel 24, disk bracket 30, disk arm 42, disk boot 52 and disk 50, it should be understood that the grain drill 10 has a plurality of these elements attached to the drill 10 plus the additional elements as herein described.

FIG. 2 is a front view of the disk 50 and disk boot 52 mounted to the disk arm 42. In this figure the bushing 45 of the disk arm 42 can be clearly seen pivotly attached on the arm shaft 40 of the U-shaped bracket arm 38 of bracket 30. The coil spring 56 includes a first end portion 62, a second end portion 64 (shown in FIG. 3) and a coiled center portion 66. The coiled center portion 66 is received around a first end portion 69 of the bushing 45 of the disk arm 42. The coil spring 56 is held in compression on the bushing 45 with the first end portion 62 held against the side of the U-shaped bracket arm 38 of bracket 30. The second end portion 64 of the coil spring is positioned on the adjustable spring tension arm 54 for applying tension thereon and for rotating the disk arm 42 downwardly and urging the disk 50 into the ground surface 17.

FIG. 2 further illustrates the additional use of a second coil spring 68. The additional coil spring 68 is shown in dotted lines and includes a first end portion 70, a second end portion 72 (shown in FIG. 3) and a center coiled portion 74. The first end portion 70 is positioned against the U-shaped bracket arm 38 of bracket 30. The center coiled portion 74 is received around a second end portion 75 of the bushing 45.

In this view the disk 50 can be seen having a convex surface 78 which is disposed against the side portion 53 of the boot 52. The side portion 53 of the boot 52 acts to clean the dirt from the convex surface 78 of the disk 50 and to hold the soil away from the bottom of the furrow as the disk 50 is rotated thereby. The boot 52 also assists in keeping the end portion 55 of the seed tube 16 held in position between the boot 52 and the rear of the disk 50 when the drill 10 is in operation.

The disk bracket 30 can be seen with the first end portion 32 bolted to the frame bar 28 by the U-shaped bolt 34. The second end portion 36 of the disk bracket 30 is shown with the U-shaped arm bracket arm 38. The arm shaft 40 is mounted to the sides of the arms 80 and 82 of the U-shaped bracket arm 38. The bushing 45 is integrally attached to the disk arm 42 and pivots on the shaft 40.

FIG. 3 is a rear view of the disk 50, disk boot 52 and disk arm 42. In this view the adjustable spring tension arm 54 which is integrally attached to the disk arm 42 can be seen more clearly. The adjustable spring tension arm 54 includes notches 84 in the sides thereof. These notches 84 can be seen receiving the second end portion 64 of coil spring 56 and the second end portion 72 of the additional coil spring 68 thereon. By moving the end portions 64 and 72 upward and placing the ends in the upper notches 84 the compression on the coil springs 56 and 68 is increased thereby increasing the tension on the disk arm 42.

Figure 4:
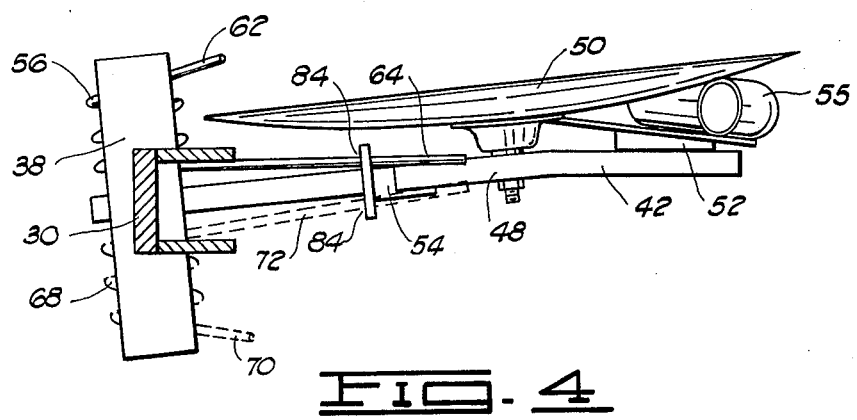
FIG. 4 is a top view of the disk, disk boot and disk biasing means.

FIG. 4 is a top view of the disk 50, disk arm 42 and disk boot 52. In this view the disk can be seen rotatably mounted to the center portion 48 of the disk arm 42. Also seen in this view is the second end portion 64 of the coil spring 56 resting in the notch 84 of the adjustable spring tension arm 54. Again the additional coil spring 68 mounted on the disk bracket 30 is shown in dotted lines.

Figure 5:
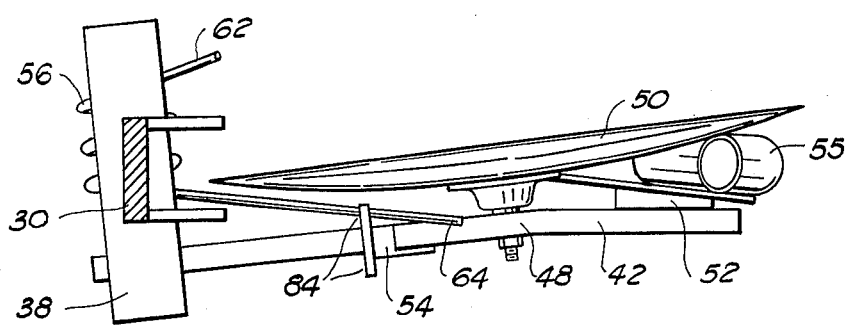
FIG. 5 is a top view of the disk, disk boot with a single disk biasing means.

FIG. 5 is similar to FIG. 4 but shows the use of the coil spring 56 mounted on the disk bracket 30 without the additional coil spring 68.

Changes maybe made in the construction and arrangement of the parts or elements of the embodiments as disclosed herein without departing from the spirit or scope of the invention as define in the following claims.

I claim:

1. In a grain drill having a frame with a seed hopper mounted thereon, a seed tube suspended from the bottom of the hopper for feeding seed from the hopper into the ground surface, gauge wheels rotatably mounted on the front of the drill frame, press wheels rotatably mounted on the rear of the drill frame, and an elongated horizontally mounted frame bar, attached to the frame, the frame bar positioned transverse to the direction of the movement of the grain drill, the improvement comprising:
   a disk bracket attached to and suspended downwardly from the frame bar;
   a disk arm having a first end portion, a second end portion and a center portion, the first end portion of said disk arm pivotally mounted to said disk bracket;
   a disk rotatably mounted to the center of said disk arm;
   a disk boot attached to the second end portion of said disk arm, said boot having a side portion disposed against the side of said disk, the seed tube disposed between said disk and said disk boot; and
   biasing means attached to said disk arm for urging said disk into the ground surface; said biasing means is a coil spring; said coil spring including a first end portion, a second end portion, and a coiled center portion, the first end portion and the coiled center portion mounted on said disk bracket, said improved grain drill further including an adjustable spring tension arm integrally attached to said disk arm, said tension arm receiving the second end portion of said coil spring thereon for adjusting the tension on said disk arm and urging said disk into the ground surface; said disk bracket including a first end portion bolted to the frame bar, and a second end portion having a U-shaped arm with an arm shaft mounted therebetween, said first end portion of said disk arm having a bushing pivotally mounted on said arm shaft of said disk bracket; the coiled center portion of said coil spring is received around a first end portion of said bushing, the first end portion of said coil spring held against the U-shaped arm of said disk bracket; said improved grain drill further including a second coil spring having a first end portion, a second end portion, and a coiled center portion, the coiled center portion of said second coil spring received around a second end portion of said bushing, the first end portion of said second spring held against the U-shaped arm of said disk bracket, the second end portion of said second coil spring disposed against said adjustable spring tension arm thereby applying additional tension to said disk arm and urging said disk into the ground surface.

* * * * *